United States Patent [19]
Yanes

[11] Patent Number: 5,202,998
[45] Date of Patent: Apr. 13, 1993

[54] FAST, SIMULTANEOUS MULTI-PROCESSOR SYSTEM STATUS COMMUNICATION INTERFACE

[75] Inventor: Adalberto G. Yanes, Tucson, Ariz.

[73] Assignee: International Business Machines Corporation, Armonk, N.Y.

[21] Appl. No.: 575,740

[22] Filed: Aug. 31, 1990

[51] Int. Cl.⁵ .................. G06F 13/00; G06F 15/16
[52] U.S. Cl. .................. 395/725; 395/200; 395/425; 364/228; 364/228.3; 364/228.1; 364/222.2; 364/284; 364/229; 364/264.6; 364/DIG. 1
[58] Field of Search .......... 364/DIG. 1, DIG. 2, 364/131, 134, 141; 395/725, 200, 425, 650, 275, 325; 340/825.06, 825.57; 370/85.2, 112

[56] References Cited
U.S. PATENT DOCUMENTS

| | | | |
|---|---|---|---|
| 4,215,399 | 7/1980 | Pavicie et al. | 364/136 |
| 4,400,773 | 8/1983 | Brown et al. | 364/200 |
| 4,402,046 | 8/1983 | Cox et al. | 395/200 |
| 4,545,011 | 10/1985 | Lyon et al. | 364/200 |
| 4,780,811 | 10/1988 | Aoyama et al. | 364/200 |
| 4,829,422 | 5/1989 | Morton et al. | 364/200 |
| 4,918,589 | 4/1990 | Floro et al. | 364/132 |
| 4,980,818 | 12/1990 | Shinmura | 364/200 |
| 5,041,969 | 8/1991 | Kawasaki et al. | 364/200 |

OTHER PUBLICATIONS

R. C. Cash et al., Multi-Processor Communications Interface, IBM TDB, Sep. 1988, pp. 467-469.

Primary Examiner—Michael R. Fleming
Assistant Examiner—Gopal C. Ray
Attorney, Agent, or Firm—Floyd E. Anderson; Manny W. Schecter

[57] ABSTRACT

Each processor in a multi-processor system has an associated interface circuit which comprises a register for storing a flag bit status and evaluation logic for comparing the stored flag bit status with an update status from the associated processor. The comparison of the update status with the stored status results in the generation of an associated change status which identifies the changed flag bits. Each interface circuit receives the change status from all other interface circuits. The generated change status is combined with the received change status to determine the combined changed flag bits from all processors. The resultant combined changed flag bits are compared with the original flag bit status and an updated flag bit status is generated therefrom. All processors in the multi-processor system can communicate their respective status changes simultaneously without following a predetermined protocol.

21 Claims, 2 Drawing Sheets

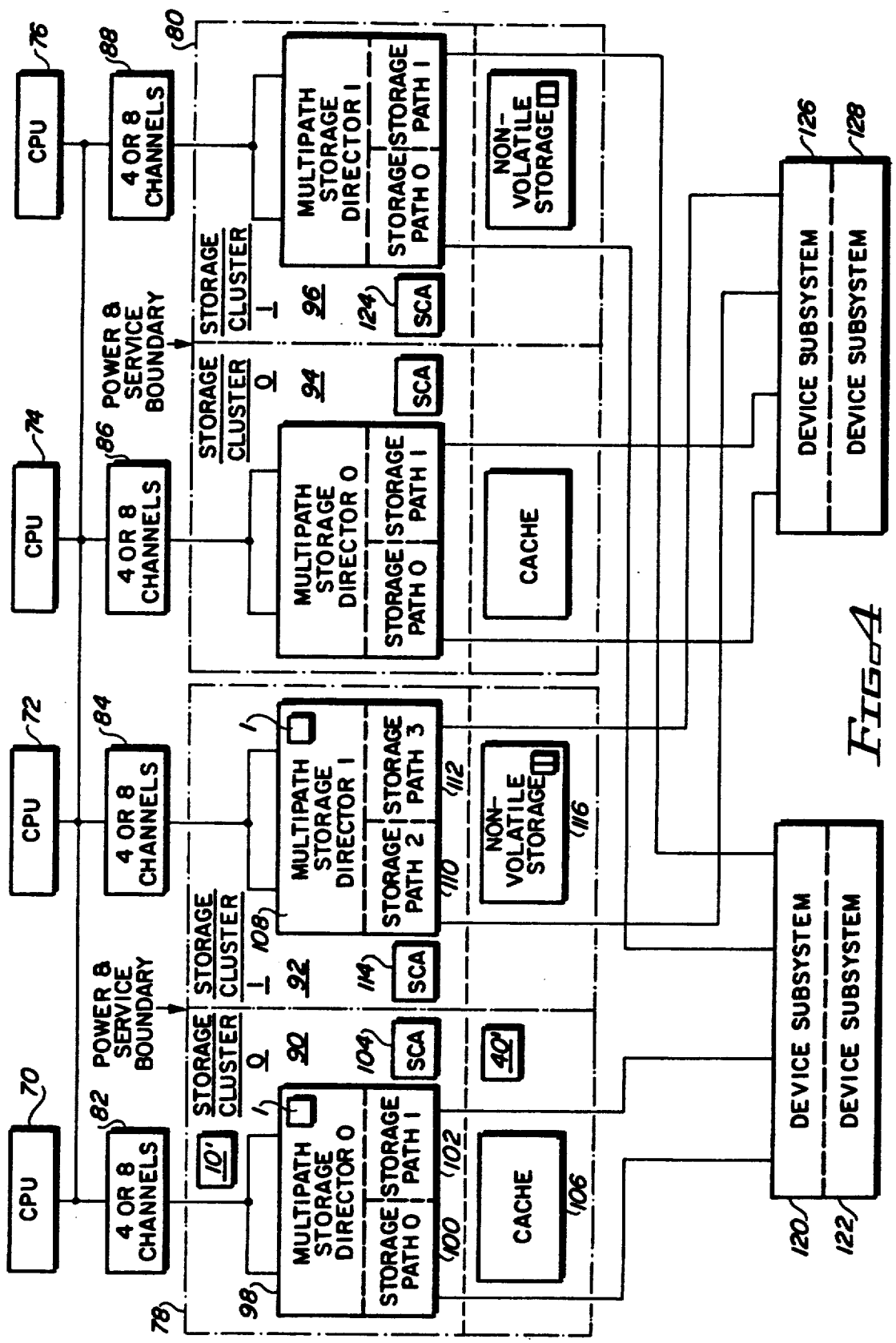

FAST, SIMULTANEOUS MULTI-PROCESSOR SYSTEM STATUS COMMUNICATION INTERFACE

FIELD OF THE INVENTION

This invention relates generally to the field of processor communication and more particularly, to a multi-processor system status communication interface that provides for simultaneous multi-processor system status communication.

BACKGROUND OF THE INVENTION

Computer systems perform their arithmetic and logic functions by a processor contained therein. The processor acts as the decision maker or the brains of such computer systems. The processor is controlled by instructions and data supplied to it by the computer system, and further by microcode which is contained within the processor itself. The microcode is an instruction set implemented as a hard-wired circuit in the processor. The processor must communicate to the computer system its status, that is whether the resources of the computer are busy, waiting for data, etc. The status may be a plurality of flag bits where each flag bit may be a logical 1 or 0. The status of the system may be written to a register for storage. The register typically contains one storage element, such as a flip-flop, for each flag bit. The processor may inspect the contents of the register to find out what the status of the computer system is.

Very commonly, computer systems utilize more than one processor for performing different functions or for sharing processing functions in order to increase system throughput. One of the processors is often a master processor and the other processors are the slave processors such that the master processor controls the slave processors. Alternatively, the processors may be treated as equals so that no one processor is controlling. Regardless of the configuration, communication between the processors require that predetermined sequences, commonly known as handshaking or communication protocols, be followed in order to avoid processor conflicts. Conflicts can arise, for example, if more than one processor were to attempt to modify the same data, or were to attempt to change the system status flag bits.

A multi-processor communication interface design may consist of a shared memory and a set of registers that are controlled by the microcode. The registers are each assigned an address so that each processor may read and write to the addressed registers. The microcode protocol controls the reading and writing of the registers, during a predetermined sequence, so that one processor may set bits in the addressed registers and the other processor may reset bits in the addressed registers. This type of interface requires the registers to first be addressed under control of the microcode, and does not allow both processors to modify the bits in the registers simultaneously. An example of such an interface is given in Multi-Processor Communications Interface, IBM Technical Disclosure Bulletin, Vol. 31, No. 4, Sep. 1988.

A multi-processor configuration where a first processor performs simple boolean logic functions and a second processor performs complex arithmetic computations is described by Pavicic, et al., U.S. Pat. No. 4,215,399. In this system, the processors communicate by two flag bit registers where the first processor sets the first flag bit register to alert the second processor that a requested complex arithmetic operation is queued up. The second flag bit register is reset by the second processor to signal the first processor that the requested operation has been completed. The first processor must necessarily check the status of the second flag bit register before writing to the first flag bit register. This communication takes at least two clock cycles to complete.

Another system providing for multiple inter-processor communication is described by Cox, et al., U.S. Pat. No. 4,402,046. Here, a global communication segment common to all processors for system-wide communication is provided. The communication segment has a field containing control flags which may be set by one processor and inspected by another processor in order to control the several processor functions. Again, the different processors read and write the control flags at different times and require specific handshaking protocols to be followed which slows computer system performance.

Thus what is needed is a multi-processor system status communication interface where any or all processors may simultaneously change the status of flag bit registers without having to first address and inspect the existing contents of the flag bit registers according to a predetermined protocol.

SUMMARY OF THE INVENTION

Accordingly, it is an object of the present invention to provide an improved multi-processor system status communication interface.

Another object of the present invention is to provide a multi-processor system status communication interface that allows simultaneous communication of system status by different processors.

Yet another object o-f the present invention is to provide a multi-processor system status communication interface that does not require the processors to follow a predetermined protocol for updating the system status.

These and other objects of this invention are accomplished by a multi-processor system status communication interface having a first evaluation circuit for storing an initial status. The first evaluation circuit is coupled to a first processor for receiving a first update, the first evaluation circuit generating a first change indication from the initial status and the first update. A second evaluation circuit also stores the initial status and is coupled to the first evaluation circuit and further coupled to a second processor for receiving a second update. The second evaluation circuit generates a second change indication from the initial status and the second update. The first evaluation circuit receives the second change indication and generates a first new status therefrom. The second evaluation circuit receives the first change indication and generates a second new status, the second new status being equal to the first new status.

The foregoing and other (objects), features and advantages of the invention will be apparent from the following more particular description of the preferred embodiment of the invention, as illustrated in the accompanying drawing.

BRIEF DESCRIPTION OF THE DRAWING

FIG. 4 is a block diagram of a data processing system having a multi-processor system status communication interface therein.

DESCRIPTION OF THE PREFERRED EMBODIMENT

Figure 1:
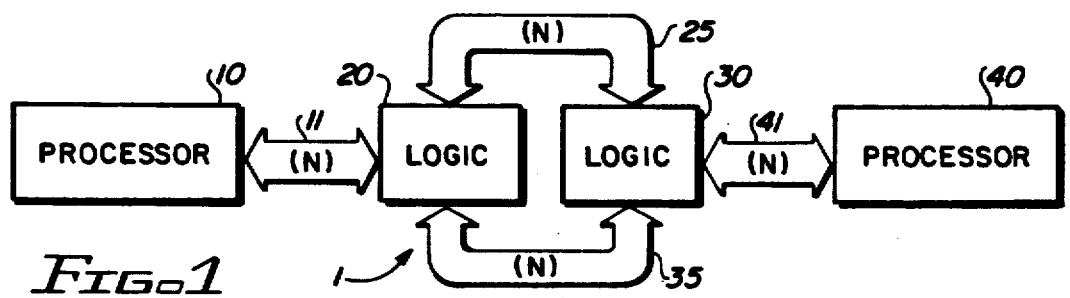
FIG. 1 block is a diagram representation of the multi-processor system communication status interface.

Referring to FIG. 1, a block diagram of the present invention is shown. A processor 10 which can simultaneously update system status with a processor 40 by a multi-processor system status communication interface 1 is shown. More than two processors may communicate simultaneously according to the present invention, however, only two processors are shown for purposes of simplicity. The processor 10 is connected to an evaluation logic 20 by a bus 11 having N lines. The processor 10 can read a first system status from the evaluation logic 20, where the first system status has a plurality of flag bits representing the status of the system. The processor 10 can also update the evaluation logic 20 by providing a first system update status thereto. The processor 40 is connected to an evaluation logic 30 by a bus 41 having N lines. Similarly, the processor 40 can read a second system status from the evaluation logic 30, where the second system status has a plurality of flag bits representing the status of the system. The processor 40 can also update the evaluation logic 30 by providing a second system update status thereto. The first system status stored in the evaluation logic 20 will be equal to the second system status stored in the evaluation logic 30 when the multi-processor system status communication interface 1 is in a steady state condition.

There are four modes of operation which may exist with respect to the multi-processor system status communication interface 1. A first mode is where no status update are made by the processors 10 and 40 and the steady state condition exists such that the first system status and the second system status are equal and do not change. The processor 10 makes a first system update status available to processor 40 in a second mode, and the processor 40 makes a second system update status available to the processor 10 in a third mode. Both processors 10 and 40 communicate their respective update statuses simultaneously in a fourth mode. Only the operation of the second and fourth modes are described below since the first mode of operation requires no change of to any status. Operation of the third mode is understood to be similar to the operation in the second mode, but opposite in direction.

In the second mode, when the processor 10 needs to make a present status available to the processor 40, the processor 10 will send the first system update status to the evaluation logic 20 on the bus 11. The evaluation logic 20 will compare the first system update status to the first system status to determine which of the plurality of flag bits are changed, and generate a processor 10 change indication therefrom. The evaluation logic 20 is connected to the evaluation logic 30 by a bus 25 and by a bus 35, each having N lines. The processor 10 change indication is received by the evaluation logic 30 on the bus 25. The first system update status is not sen to the evaluation logic 30, but only the processor 10 change indication is sent. In effect, the evaluation logic 30 is only made aware of which flag bits the processor 10 is changing (i.e., newly set flag bits or reset flag bits). Simultaneously, a processor 40 change indication from the evaluation logic 30 is sent to the evaluation logic 20 by the bus 35. However, in the second mode the status from the processor 40 has not changed and the processor 40 change indication will show no change. As an example, every flag bit changed by the processor 10 can be represented by a binary "one" in that flag bit's corresponding position in the processor 10 change indication. In this example, the processor 40 change indication would be all binary "zeros."

The evaluation logic 30 combines the processor 40 change indication with the processor 10 change indication received from the evaluation logic 20 and compares the combination with the second system status for generating a second new system status for storage therein. Simultaneously, the evaluation logic 20 combines the processor 10 change indication with the processor 40 change indication and compares its combination with the first system status and generates a first new system status for storage therein. The first new system status stored in the evaluation logic 20 is equal to the second new system status stored in the evaluation logic and represents a current flag bit status available both processors 10 and 40.

The fourth mode of operation is similar to the second mode, except that now both processors 10 and 40 communicate a change in flag bits which is different than the previous flag bits each processor 10 and 40 last communicated. The first system and the processor 40 send a processor 10 update status and a second system update status, respectively, to the evaluation logic 20 and 30, respectively. A processor 10 change indication and a processor 40 change indication is generated in the evaluation logic 20 and 30, respectively, to reflect the modified flag bits from each processor 10 and 40, respectively. The processor 10 and 40 change indications are communicated to the evaluation logics 30 and 20, respectively, by the buses 25 and 35, respectively. The processor 10 change indication is combined in the evaluation logic 30 with the processor 40 change indication, and the processor 10 change indication is combined in the evaluation logic 20 with the processor 40 change indication. The combination generated in the evaluation logic 20 is equal to the combination generated in the evaluation logic 30. Each evaluation logic 20 and 30 compares its corresponding combination with the first system status and the second system status, respectively, to generate the first new system status and the second new system status, respectively. The first new system status and the second new system status will be equal since the first system status and the second system status are equal.

Figure 2:
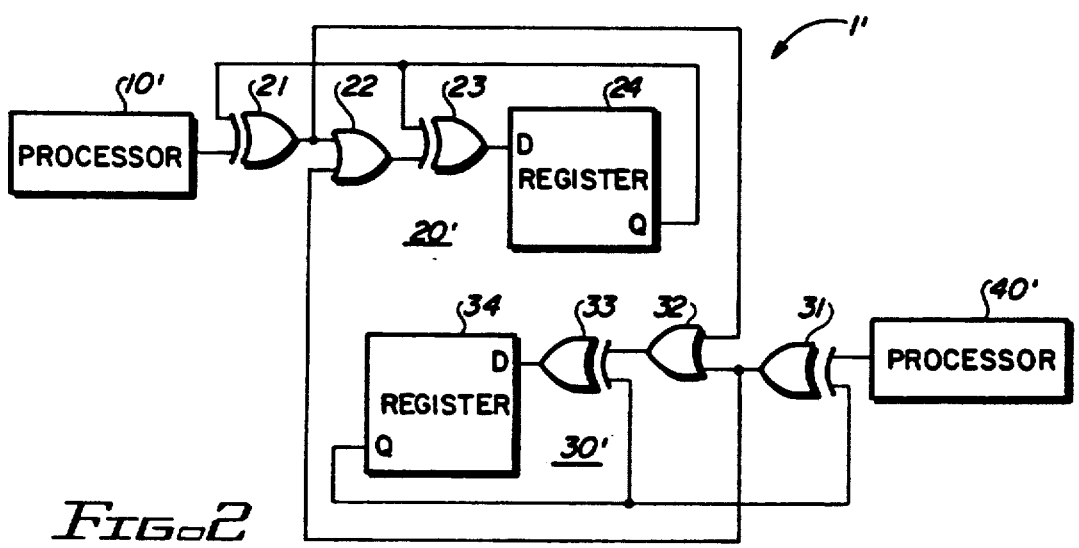
FIG. 2 is a schematic diagram of the preferred embodiment of the present invention.

A circuit diagram of the present invention is shown in FIG. 2 for which a more detailed description of the operation of the present invention is given. Like structures from FIG. 1 are represented in FIG. 2 by primed numbers. An evaluation logic 20' has a register 24 for storing the first system status, the register 24 having an output Q connected to a first input of an exclusive-or gage 21 and to a first input of an exclusive-or gate 23. An output of a processor 10' is connected to a second input of the exclusive-or gate 21 such that the first system status can be compared to a first system update status from the processor 10' and a processor 10' change indication is generated by the exclusive-or gate 21. An output of the exclusive-or gate 21 is connected to an evaluation logic 30' and to a first input of an OR gate 22.

A second input of the OR gate 22 is connected to the evaluation logic 30' for receiving a processor 40' change indication. The OR gate 22 combines the processor 10' change indication with the processor 40' change indication to generate a first combined change indication. An output of the OR gate 22 is connected to a second input of the exclusive-or gate 23 where the first combined change indication is compared to the first system status for generating a first new system status. Finally, an output of the exclusive-or gate 23 is connected to a D input of the register 24 for storing the first new system status in place of the first system status.

The evaluation logic 30' is similar to the evaluation logic 20' wherein its devices numbered 31, 32, 33, and 34 are equivalent to devices 21, 22, 23, and 24, respectively. The evaluation logic 30' is further connected similarly to the evaluation logic 20', the exceptions being that the exclusive-or gate 31 has a first input connected to the processor 40' and the OR gate 32 has a first input connected to the evaluation logic 20' for receiving the processor 10' change indication. While FIG. 2 has been shown and described with only one bit, it can be appreciated that the number of registers and inputs per gate will vary according to the size of the data bus, or the number of flag bits. Further more, additional processors may by added with respective additional evaluation logics for system expansion.

The second mode of operation can be better understood by the following example. The first system status is assumed to be Hex 04 (assuming an eight bit word). The first system status could be the result of the initialization at power up or the result of a previous communication by the processors 10' and 40'. Next it is assumed that the second system status does not change and hence the output of processor 40' is equal to Hex 04. Processor 10' needs to make the first system update status available to processor 40' and Hex 8C appears at its output. The first system status and the first system update status are exclusive-or'ed by the exclusive-or gate 21 to determine which flag bits have changed with the result being Hex 88. The same exclusive-or'ing step is provided by the exclusive-or gate 31 with a result of Hex 00 since no flag bits were changed by the processor 40'.

The Hex 00 from the exclusive-or gate 31 is combined with the Hex 88 from the exclusive-or gate 21 to produce the combined result of flag bits changed by the processors 10' and 40'. Since only the processor 10' changed flag bits the combined result is equal to Hex 88 which is equivalent to the result outputted from the exclusive-or gate 21. Similarly, the OR gate 32 combines the flag bits changed by the processors 10' and 40' which is the combination of Hex 88 from the exclusive-or gate 21 and Hex 00 from the exclusive-or gate 31. The result is again Hex 88 so that both evaluation logic 20' and 30' produce the same combined change flag bit results. The exclusive-or gates 23 and 33 simultaneously compare the combined change flag bit indication to the first system status and the second system status, respectively. Since both registers 24 and 34 contain Hex 04 the result of each comparison is Hex 8C. Hex 8C is the first and second new system status and is stored in both registers 24 and 34. A similar operation will take place in the third mode where only the processor 40' presents an update status. Hex 8C represents the current system status available both processors 10' and 40'.

The fourth mode of operation includes the simultaneous presentation of the first system update status and second system update status. The first system status and the second system status stored in the registers 24 and 34, respectively, are both assumed to be Hex 44. The first system update status is Hex C4 while the second system update status is Hex 40. In this example, the processor 10' changes one flag bit (bit 7) and the processor 40' changed one flag bit (bit 2). The exclusive-or gate 21 will compare the first system update status Hex C4 with the first system status Hex 44 to generate the processor 10' change indication which is a single flag bit change equal to Hex 80 (representing flag bit 7 as the only flag bit to change).

Similarly, the exclusive-or gate 31 compares the second system new status Hex 40 with the second system status Hex 44 to generate the processor 40' change indication equal to Hex 04 (representing flag bit 2 as the only flag bit to change).

The processor 40' change indication is combined with the processor 10' change indication at the OR gate 22 and simultaneously at the OR gate 32. Each OR gate 22 and 32 simultaneously combined the processor 10' change indication and the processor 40' change indication respectively, which si the or'ing of Hex 80 and Hex 04 for a result of Hex 84. Hex 84 represents all the flag bits which have been changed by the processors 10' and 40' (processor 10' changed bit 7 to a binary 1 and processor 40' changed flag bit 2 to a binary 0).

The next operation is the comparison of the combined change indication Hex 84 to the status Hex 44 by the exclusive-or gate 23 and concurrently, the comparison of the combined change indication Hex 84 to the second system status Hex 44 by the exclusive-or gate 33. The result of these comparisons is the generation of the first new system status of Hex C0, and the second new system status, also equal to Hex C0. The first new system status and the second new system status can then be stored in the registers 24 and 34, respectively, thereby replacing the processor 10' status and the processor 40' status, respectively. Hex C0 represents the correct status of the flag bits due to the simultaneous communication of the first system and second system. This is more clearly seen by examining the individual flag bits that have been changed.

For example, Hex C0 represents that bit 2 should be reset to a binary "zero" according to the processor 40' new status, and flag bits 6 and 7 are both set to a binary 1 representing that neither processor 10' or 40* reset flag bit 6 and that the processor 10' set flag bit 7.

From this example, it can be appreciated that both processors 10' and 40' are able to simultaneously communicate to make available to each other a change in flag bit status without having to follow cumbersome protocols, without requiring microcode to check statuses, and without requiring additional registers.

Figure 3:
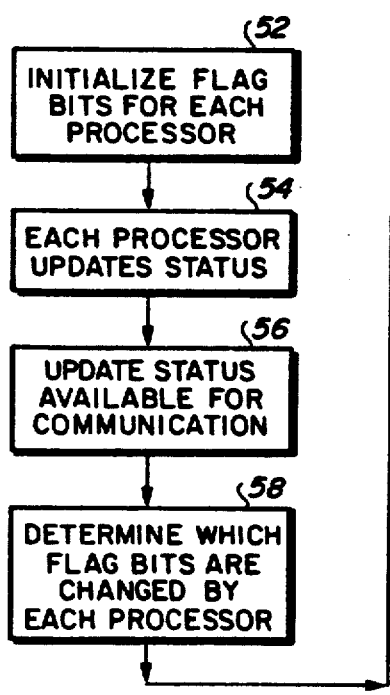
FIG. 3 is a flow diagram of the method of operation of the present invention.
Figure 3:
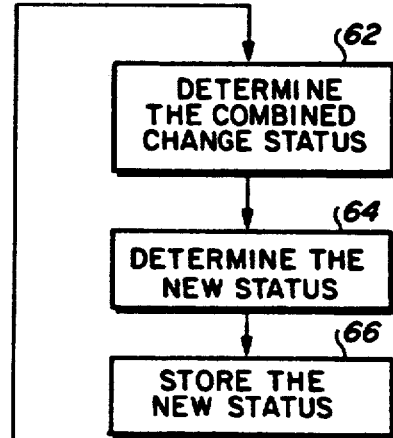

A method of operation of the present invention is diagrammed in FIG. 3 with step 52 representing the initialization or the steady state value of the flag bits. Step 52 includes storing the initial status available to each processor in its associated register. In steps 54 and 56, each processor presents its update status by setting or resetting respective flag bits, and then making the new statuses available at each respective processor's output. Furthermore, in steps 54 and 56, each processor may present its update status either simultaneously or sequentially or, less than all of the processors may present an update status while the remaining processors do not present an update status. Step 58 determines which flag bits are newly set or reset by each processor relative to the previous system status so that a change indication is generated for each processor. The change indication for each processor is combined with the change indication of every other processor in step 62 to determine the combined change of flag bits (combined change status) from all of the processors. The combined change indication is next compared to the initial or steady state value of the flag bits to determine the new status of the system. The new status can than be stored in each system register until it is further updated by further communication by the processors as shown in step 66.

Referring now to FIG. 4, there is shown a multi CPU and shared device configuration. A plurality of CPU systems identified with the reference numerals 70, 72, 74 and 76 are suitably cross connected to a pair of controller systems 78 and 80, via a plurality of channels 82, 84, 86 and 88. Each controller system, 78 and 80, includes two storage clusters.

Controller system 78 includes storage clusters 90 and 92, while controller system 80 includes two storage clusters 94 and 96. Storage cluster 90, for instance, includes a multi path storage director 98, which in turn includes two storage paths 100 and 102. Each storage cluster 90 also includes a shared control array (SCA) 104 and can include a cache memory system 106. The storage cluster 92 includes a multi path storage director 108 and two storage path controls 110 and 112, as well as its own shared control array (SCA) 114. Storage cluster 92 includes a nonvolatile storage 116. The control system 78 has its storage paths 100 and 102 connected to a plurality of devices divided into two device subsystems 120 and 122. Using a device level selection enhanced mode of data transfer, simultaneous data transfer is possible over all four storage paths, within the same four path string. Each device subsystem 120 and 122 has communication with each storage path 100 and 102 of the storage cluster 90 as well as communication with the storage paths of storage cluster 80.

Two device subsystems 126 and 128 are connected to the storage paths 110 and 112 of the storage cluster 92 and the storage paths of storage cluster 94. Both sets of device subsystems 120, 122, and 126, operate in tandem, as controlled by the controller systems 78 and 80.

Each of the storage clusters in each of the controller systems operate as independent components. Each storage cluster provides a separate power and service region and two separate paths to the devices. The loss of power to one storage cluster does not prevent access to data because the processing can continue through other storage clusters. All of the devices connected to the controller systems are cross configured to both controller systems and to one storage cluster within each of the controller systems. The devices in the device subsystems 120 and 122 are generally direct access storage devices (DASD) disk devices, although the devices could be tape or optical devices. Each storage cluster has its own support facility. Each storage cluster contains a volatile product data storage module that stores the features of the controllers, the subsystem mode of operations, the subsystem identifiers, the subsystem configuration, the controller unit addresses for each channel, the type of channel and the channel speed connected to each storage cluster and the number of addressable devices that can be attached to the logical systems in the devices block.

The device level selection enhanced mode of operation permits two multi path storage directors to access data in the device subsystems. Each multi path storage director has two storage paths, as shown in FIG. 4. The device level selection enhanced mode provides four independent and simultaneous data transfer paths to the same two device subsystems from the two controller systems. The input/output operation can be dynamically reconnected on any one of the four paths. Thus there are four complete independent paths from the CPU to the devices.

Each storage cluster 90, for instance, contains channel attachments to connect the channel 82 to the multi path storage director 98. The storage director 98 is connected to the two storage paths 100 and 102. The storage cluster 90 includes the shared control array 104. The cache 106 and the nonvolatile storage 116 are shared by the storage path in both the storage cluster 90 and the storage cluster 92, but are physically and logically separate from the storage clusters. Each storage cluster is an independent component. Each provides a separate power and service region and two separate paths to the device subsystem. Cache and nonvolatile storage are accessed by both storage cluster in one controller system. The storage directors interpret channel commands and control the storage paths, the cache, the nonvolatile storage, and the attached devices in the device subsystem. Each storage path is separately connected to all devices in the device subsystems. During a channel connected operation, the storage path is coupled with a particular channel. The multi-path storage director provides, through a single channel address, multi-path access to the devices. Through one storage director address, the multi path storage director selects either storage path in the storage cluster for data transfer operation. The shared control array contains the status information about the storage paths and the devices.

Each set of device subsystems, device subsystems 120 and 122 for instance, is connected to both controller systems 78 and 80. Each has a line to each storage path, storage path 100 and 102 for instance, of each storage director, storage director 98 for instance. Thus, device systems 120 and 122, for instance, has four paths to the CPU's, two to storage cluster 90 of controller system 78 and two to storage cluster 96 of controller system 80. Thus, on a poll sequence, an interrupt request from a device in either device subsystem 120 or 122 will be sensed by all four storage paths. Any one of the storage paths can satisfy the interrupt.

The cache 106 is a high density, electronic storage that is shared by all storage paths connected to the controller system 78. Frequently used data can be transferred to and from the cache 106 and the channel 82 at channel speeds. Access time between the cache 106 and one channel of the channels 82 is much faster than between the devices of the device subsystems and the channel because there are no delays. The cache 106 is in a separate power region from the storage clusters 90 and 92, to permit the cache processing through either storage cluster, when the other storage cluster is off line for any reason.

The nonvolatile storage 116 provides random access electronic storage. A battery backup system maintains power to the nonvolatile storage 116. The nonvolatile storage holds the data that needs to be transferred to the devices of the device subsystems 120 and 122. If power is lost to the controller system 78 before the information can be transmitted to the devices, the data is held in the nonvolatile storage 116 until the power is restored, at which time the data is destaged to the devices.

The shared control arrays 104 and 114 are electronic storage that contains the information about the status of the controller system 78 and the attached devices in the device subsystems. Identical information is kept in the shared control array of each storage cluster. In the pairing such as shown in FIG. 4, the shared control array information is duplicated into the two storage clusters that are paired together. For instance, the shared control array 104 of storage cluster 90 is paired to a shared control array 124 in the storage cluster 96.

The multiprocessor system status communication interface 1' exists in each of the storage clusters 90, 92, 94 and 96. More specifically, a multiprocessor system status communication interface 1' exists in each multi path storage director, for example multi path storage directors 98 and 108. Furthermore, the processors' 10' and 40', as shown in FIG. 2, exist in each of the storage clusters 90, 92, 94 and 96. Each processor 10' monitors the status of the data between a channel and a storage cluster while each processor 49' monitors the status of the data between a storage cluster and its corresponding device subsystems.

Each processor 10' can update the status of a data transfer between the channels and the storage cluster while each processor 40' can update the status of a data transfer between each storage cluster and the device subsystems, since each processor can update such status without having to wait for the other processor to finish updating such status. The processors are able to communicate without the delays typically associated with communication protocols.

While the invention has been particularly described with reference to particular embodiments thereof, it will be understood by those skilled in the art that various other changes in detail may be made therein without departing from the spirit, scope, and teaching of the invention. For example, the invention has been described using 8 flag bits, but it can be appreciated that more flag bits may be communicated. Furthermore, the invention has been described using only two processor, but more processors can be added by expanding the number of evaluation logics 20' and 30'.

What is claimed is:

1. A communication interface for providing simultaneous update and access to status of a system first and second processors wherein said communication interface stores a first and second status to indicate the present status available to said first and second processors, respectively, said first and second processors providing a first and second update, respectively, for indicating a change in status, said communication interface storing a first and second new status reflecting the first and second updates, comprising:
   first evaluation means and second evaluation means;
   said first evaluation means storing the first status, and coupled to said first processor for receiving the first update, said first evaluation means generating a first change indication from the first status and the first update, said first evaluation means further coupled to said second evaluation means for receiving a second change indication, and combining the first change indication with the second change indication for generating the first new status; and
   said second evaluation means storing the second status, and coupled to said second processor for receiving the second update simultaneous with the first evaluation means receiving the first update, said second evaluation means receiving the first update, said second evaluation means generating the second change indication from the second status and the second update, said second evaluation means coupled to said first evaluation means for receiving the first change indication, and combining the first change indication with the second change indication for generating the second new status.

2. The communication interface according to claim 1 wherein the first status is equal to the second status.

3. The communication interface according to claim 1 wherein said first evaluation means comprises:
   a first exclusive-or gate, a first OR gate, a second exclusive-or gate and a first latching means;
   said first exclusive-or gate having a first input coupled to said first latching means for receiving the first status, a second input coupled to said first processor for receiving the first update, and having an output for providing the first change indication;
   said first OR gate having a first input coupled to the output of said first exclusive-or gate, a second input coupled to said second evaluation means for receiving the second change indication, and having an output;
   said second exclusive-or gate having a first input coupled to the output of the first OR gate, a second input coupled to said first latching means for receiving the first status, and an output for providing the first new status; and
   said first latching means for storing the first status and coupled to said second exclusive-or gate for receiving and storing the first new status.

4. The communication interface according to claim 3 wherein said second evaluation means comprises:
   a third exclusive-or gate, a second OR gate, a fourth exclusive-or gate and a second latching means;
   said third exclusive-or gate having a first input coupled to said second latching means for receiving the second status, a second input coupled to said second processor for receiving the second update, and having an output for providing the second change indication;
   said second OR gate having a first input coupled to the output of said third exclusive-or gate for receiving the second change indication, a second input coupled to said first evaluation means for receiving the first change indication, and having an output;
   said fourth exclusive-or gate having a first input coupled to the output of said second OR gate, a second input coupled to said second latching means for receiving the second status, and an output for providing the second new status; and
   said second latching means for storing the second status and coupled to said fourth exclusive-or gate for receiving and storing the second status.

5. The communication interface according to claim 4 wherein the first new status replaces the first status.

6. A flat bit communication interface circuit for providing simultaneous flag bit status to first and second processors, the flag bit status including a plurality of flag bits, comprising:
   first logic means, second logic means, first storage means and second storage means;
   said first logic means coupled to said first processor for receiving a first processor update and coupled to said first storage means for receiving a first stored status, said first logic means generating a first new status therefrom;

said second logic means coupled to said first logic means, and coupled to said second processor for receiving a second processor update simultaneous with said first logic means receiving the first processor update and coupled to said second storage means for receiving a second stored status, said second logic means generating a second new status therefrom;

said first storage means storing the first stored status and coupled to said first logic means for receiving and storing the first new status; and said second storage means storing the second stored status and coupled to said second logic means for receiving and storing the second new status simultaneous with said first storage means receiving and storing the first new status.

7. The flag bit communication interface according to claim 6 wherein said first logic means generates a first processor change indication.

8. The flag bit communication interface according to claim 7 wherein said second logic means generates a second processor change indication.

9. The flag bit communication interface according to claim 8 wherein said first logic means receives the second processor change indication and said second logic means receives the first processor change indication.

10. The flag bit communication interface according to claim 9 wherein said first storage means stores the first new status.

11. The flag bit communication interface according to claim 10 wherein said second storage means stores the second new status.

12. A method of updating system status information available to at least first and second processors through a communication interface having a first and second register, said first and second processors coupled to the communication interface, wherein said at least first and second processors may simultaneously change a plurality of system flag bits, the method comprising the steps of:

storing a first status and a second status in said first and second registers, respectively, the first and second statuses comprising the plurality of flag bits;

providing a first processor update from said first processor to said communication interface;

providing a second processor update from said second processor to said communication interface simultaneous with said providing a first processor update to said communication interface;

determining which flag bits are different between the first status and the first processor update, and generating a first change indication therefrom;

determining which flag bits are different between the second status and the second processor update, and generating a second change indication therefrom;

combining the first and second change indications;

determining a first new status from the combining step and the first status; and storing the first new status in said first register so that the first status is replaced by the first new status.

13. The method according to claim 12 wherein the first status is equal to the second status.

14. The method according to claim 13 wherein the first update is equal to the second processor update.

15. The method according to claim 14 wherein the first processor update is equal to the first processor status.

16. The method according to claim 13 wherein the first processor update is not equal to the second processor update.

17. The method according to claim 16 wherein the method further comprises the steps of:

determining a second new status from the combining step and the second status; and storing the second new status in said second register simultaneous with said storing the first new status in said first register so that the second status is replaced by the second new status.

18. The method according to claim 17 wherein the first new status is equal to the second new status.

19. A controller system for transferring data between at least one CPU and at least one device subsystem, said at least one CPU and said controller system coupled by at least one channel, the controller system updating the status on the channel side and the device subsystem side simultaneously, comprising:

a storage cluster;

a multi path storage director in said storage cluster;

a first processor in said storage cluster for monitoring the status of said at least one channel;

a second processor in said storage cluster for monitoring the status of said at least one device subsystem; and a flag bit communication interface circuit in said multi path storage director for providing simultaneous flag bit status to said first and second processors, the flag bit status including a plurality of flag bits, said flag bit status communication interface circuit further comprising:

first logic means, second logic means, first storage means and second storage means;

said first logic means coupled to said first processor for receiving a first processor update indicating said at least one channel status and coupled to said first storage means for receiving a first stored status, said first logic means generating a first new status therefrom;

said second logic means coupled to said first logic means, and coupled to said second processor for receiving a second processor update simultaneous with said first logic means receiving the first processor update and indicating said at least one device subsystem status and coupled to said second storage means for receiving a second stored status, said second logic means generating a second new status therefrom;

said first storage means storing the first stored status and coupled to said first logic means for receiving and storing the first new status; and said second storage means storing the second stored status and coupled to said second logic means for receiving and storing the second new status simultaneous with said first storage means receiving and storing the first new status.

20. The controller system according to claim 19 wherein said first logic means generates a first processor change indication and said second logic means generates a second processor change indication.

21. The controller system according to claim 20 wherein said first logic means receives the second processor change indication and said second logic means receives the first processor change indication.

* * * * *

UNITED STATES PATENT AND TRADEMARK OFFICE
CERTIFICATE OF CORRECTION

PATENT NO. : 5,202,998
DATED : April 13, 1993
INVENTOR(S) : A.G. Yanes

It is certified that error appears in the above-indentified patent and that said Letters Patent is hereby corrected as shown below:

Column 9, line 68, delete "said second evaluation means receiving the first".

Column 10, line 1, delete "update,".

Column 10, line 58, the word "flat" should be --flag--.

Signed and Sealed this

Twenty-sixth Day of April, 1994

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,202,998
DATED : April 13, 1993
INVENTOR(S) : Adalberto B. Yanes

It is certified that error appears in the above-indentified patent and that said Letters Patent is hereby corrected as shown below:

At column 11, line 68, after word "first", insert --processor--.

At column 12, line 2, delete the word "processor" in its second occurrence.

Signed and Sealed this

First Day of November, 1994

Attest:

BRUCE LEHMAN

Attesting Officer     Commissioner of Patents and Trademarks